(12) United States Patent
Walker

(10) Patent No.: US 9,139,385 B2
(45) Date of Patent: Sep. 22, 2015

(54) APPARATUS AND SYSTEM FOR THE UNLOADING OF OPEN TOP RAIL CARS

(76) Inventor: Robert Walker, Seabrook, TX (US)

(*) Notice: Subject to any disclaimer, the term of this patent is extended or adjusted under 35 U.S.C. 154(b) by 700 days.

(21) Appl. No.: 13/352,910

(22) Filed: Jan. 18, 2012

(65) Prior Publication Data

US 2013/0039727 A1 Feb. 14, 2013

(51) Int. Cl.
*B65G 69/28* (2006.01)
*B65G 69/30* (2006.01)

(52) U.S. Cl.
CPC ............................. *B65G 69/30* (2013.01)

(58) Field of Classification Search
CPC ..................................................... B65G 69/30
USPC ................ 14/71.1; 414/339, 373, 394, 537
See application file for complete search history.

(56) References Cited

U.S. PATENT DOCUMENTS

| | | | | |
|---|---|---|---|---|
| 330,754 A * | 11/1885 | Tuck | .............................. | 414/373 |
| 1,978,485 A * | 10/1934 | Brodell | ........................... | 193/41 |
| 2,906,212 A * | 9/1959 | Hayes | ........................... | 104/137 |
| 3,153,489 A * | 10/1964 | Leavengood et al. | ......... | 414/537 |
| 3,580,373 A * | 5/1971 | Stickle | .............................. | 193/5 |
| 3,757,972 A * | 9/1973 | Martin | ........................... | 414/537 |
| 3,834,565 A * | 9/1974 | Goodman et al. | ............ | 414/537 |
| 4,088,235 A * | 5/1978 | Thacker | ........................ | 414/537 |
| 4,616,373 A * | 10/1986 | Perez | .............................. | 14/72.5 |
| 4,715,769 A * | 12/1987 | Kirtley | ............................ | 414/571 |
| 4,830,562 A | 5/1989 | Frederking | | |
| 5,066,188 A | 11/1991 | Bush | | |
| 5,342,159 A | 8/1994 | Warren, Jr. et al. | | |
| 5,733,091 A | 3/1998 | Long | | |
| 5,802,983 A | 9/1998 | Manzini | | |
| 6,190,106 B1 | 2/2001 | Richardson et al. | | |
| 6,484,343 B1 * | 11/2002 | Phillips | ......................... | 14/69.5 |
| 6,524,055 B1 * | 2/2003 | Overbye | ........................ | 414/537 |
| 6,536,064 B1 * | 3/2003 | Swink et al. | .................... | 14/69.5 |
| 6,543,985 B1 * | 4/2003 | Harstad et al. | ................ | 414/537 |
| 6,561,742 B1 | 5/2003 | Crawford et al. | | |
| 6,837,669 B2 * | 1/2005 | Reed et al. | ..................... | 414/537 |
| 7,690,878 B2 | 4/2010 | Aaron | | |
| 8,079,798 B2 * | 12/2011 | Smith et al. | ................... | 414/537 |

* cited by examiner

*Primary Examiner* — James Keenan
(74) *Attorney, Agent, or Firm* — Egbert Law Offices, PLLC

(57) ABSTRACT

An apparatus for the unloading of an open top railcar apparatus has a ramp with a top surface and a bottom surface, a leg member affixed to the ramp so as to support the bottom surface of the ramp a distance above an underlying surface, and a hanger affixed to one end of the ramp so as to be suitable for positioning into the open top of the rail car. The leg member has first arm affixed to the first side member, a second side member affixed to the second side member, and bar affixed to the arms and extending therebetween.

7 Claims, 4 Drawing Sheets

APPARATUS AND SYSTEM FOR THE UNLOADING OF OPEN TOP RAIL CARS

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to unloading systems for open top rail cars. More particularly, the present invention relates to ramps whereby excavators can be driven toward the open top of the rail car so as to remove material from or introduce material the interior of the railcar.

2. Description of Related Art Including Information Disclosed Under 37 CFR 1.97 and 37 CFR 1.98

Railroads use open top cars to haul a variety of bulk cargo. Among the types of cars are hopper cars which have two, three, or four bays in which the bulk cargo is adapted to be unloaded by chutes in the bottom of each bay. Another type of railroad car used to haul the bulk cargo is the ore car which may have an unloading chute at the base of its structure. The third type of railroad car which hauls, on occasion, bulk cargo, is the gondola car which usually has much shorter sides than hopper cars and is used to haul a variety of cargo, not just bulk. The ore and hopper cars have high sides, usually reinforced to keep the pressure of the bulk ore or coal from pressing outwardly and caving in the sides. Some cars must be rotary dumped or unloaded from the top.

Both discrete products, such as lumber products, metal ingots, and products made discrete by packaging as in bags or the like, and particular, fungible products, such as sand, coal, gravel and grain, are frequently transported in open top containers, such as railway gondola cars.

In the prior art, the unloading of open top containers, such as hopper and gondola cars, has presented a variety of problems which have been dealt with by differing techniques in different situations. The techniques of the prior art for unloading open top containers, such as gondola cars, include manual unloading, the use of car dumpers, and the use of cranes, shovels or the like, for unloading. The prior art includes the use of a crane fixedly positioned alongside the railway tracks for unloading cars which are successively brought alongside the crane by being propelled along the track. The use of cranes, shovels, or backhoes supported atop fixed frame members which straddle railway tracks and the cars running thereon permits the material handling machine atop the frame to unload the cars contents as they run beneath the frame member. Shovels, backhoes and the like can also be installed upon moveable underframe members which straddle the tracks and support the material handling equipment at a height exceeding the height of the car being unloaded. Some ore and hopper cars are designed to be unloaded either by opening chutes on the bottom of their compartments or by being turned upside down with the section of track on in a huge unloader which rotates 180°. This is the ideal situation, but in most cases the use of such an unloader is not practical. This requires a complex structure underneath the track such that the bulk cargo can pour into it as it passes from the bottom of the hopper or ore cars.

When such equipment is not available, railroads and shippers have turned to expensive trackside unloading equipment, such as large traveling cranes similar to those that unload the holds of ships or stationary cranes able to pivot over the hopper cars. Such facilities are usually found at the shippers facility, at a major coal loading operation, or at a terminal at the dock for bulk being shipped by boat or at a major railroad yard.

In a great deal of the cases, such unloading equipment is just not available. Since there are new shippers of bulk and buyers of that bulk cargo coming on line constantly, there is a need for a simple, inexpensive loading and unloading apparatus which will do the job quickly and cheaply.

In the past, various patents have issued relating to the loading and unloading of open top railcars. For example, U.S. Pat. No. 5,066,188, issued on Nov. 19, 1991 to D. E. Bush, shows an apparatus for loading and unloading an open top railroad car by utilizing a conventional material handling equipment item attached to a slidable structure. The material handling equipment is equipped with a boom structure and material handling device. During railcar loading and unloading operations, the operator positions and attaches the material handling equipment item onto the slidable structure which is positioned adjacent to an end of the railcar. The front of the structure is engaged with the top surface of the railcar endwall and the material handling device is positioned on the railroad bed adjacent to the rear of the slidable structure. The boom structure is then extended to position the apparatus atop the railcar. The apparatus is then supported on the sidewall upper surface of the railcar by support members which are hydraulically extendable from the structure ends. The support members are equipped with stabilizer dogs which extend downwardly adjacent to the upper surface of the parallel sidewalls of the railcar for stability while loading and unloading material. The apparatus is moved forward or backward along the top of the railcar by a hydraulic winch mounted in the center of the slidable structure.

U.S. Pat. No. 5,342,159, issued on Aug. 30, 1994 to Warren, Jr., et al., provides an access and support apparatus for loading and unloading gondola cars using a crane-type crawler. There is a trailer-mounted ramp for disposition in close proximity to the railroad car. Multiple pallets are adapted for spanning the top width of the gondola railroad car and supporting the crane-type crawler. The crane-type crawler is unloaded from the trailer and traverses the ramp to the pallets. The pallets are sequentially moved from the rear to the front of the crane-type crawler as the crawler loads or unloads the railroad cars and traverses the length of the cars.

U.S. Pat. No. 5,733,091, issued on Mar. 31, 1998 to J. Long, describes rail transportable ramps for intermodal trains. This ramp has a pair of parallel, spaced ramp members each having a first end for engaging a ground level surface and a second end for engagement with a loading end of a rail car. A rigid cross-member extends between the ramp members adjacent the first ends. A flange is attached to the second ends of the ramp members for releasably coupling the ramp members to the rail car. The rail car has a slanted surface on each of opposite sides of the loading end for engaging the flange and restraining the ramp members. The rail car also incorporates rollers at the loading end for facilitating movement of the ramp members between a loaded position and a latching position.

U.S. Pat. No. 5,802,983, issued on Sep. 8, 1998 to C. J. Manzini, shows a railroad platform cart for the transport of heavy equipment, machinery and vehicles. The system includes a low-profile platform cart without motorization and a portable loading ramp for loading vehicles and such onto the cart. The cart also has a rear plow which is capable of removing ballast and debris from the tracks.

U.S. Pat. No. 6,190,106, issued on Feb. 20, 2001 to Richardson et al., provides an apparatus for loading open top railroad cars. This apparatus utilizes a crawler excavator having a pair of tracked treads and a hinged arm with a bucket thereon able to rotate a fill 360° and to move forward and rearward atop the open top railroad car. There is an attachment on the crawler with side extensions to hold the crawler atop the rail cars due to the side extensions slidably resting atop the sides of the rail car. There is provided a portable ramp by which the crawler excavator can mount the ends of the cars.

U.S. Pat. No. 6,561,742, issued on May 13, 2003 to Crawford et al., provides an apparatus for loading and unloading of railcars. This apparatus includes a mobile machine adapted to operate atop an open top rail car. A plurality of support subassemblies have surfaces adapted to engage upper surfaces of sidewalls of the rail car when the apparatus is positioned thereon. The support subassemblies are removable. The apparatus also has a boom structure with a bucket attached at an end thereof. The apparatus can move atop the rail car on its own power, or by coordinated use of the boom structure to push or pull the apparatus along the rail car.

U.S. Pat. No. 7,690,878, issued on Apr. 6, 2010 to C. W. Aaron, teaches a rail car having extendable ramp which is movable by a load bearing drive system. The ramp is stored under the deck of a rail car and can be extended by using the load-bearing drive system. The structure of the ramp includes a rail portion to allow the loading of rail-bound equipment, such as rail maintenance equipment, onto the deck of the rail car.

U.S. Pat. No. 4,830,562, issued on May 16, 1989 L. E. Frederking, provides a method and apparatus for loading and unloading a railroad. This apparatus has spaced-apart, parallel side walls with upper surfaces. The apparatus also includes a hydraulic excavator for the excavating, loading, and unloading materials. The excavator has a boom structure and a material-engaging device rotatably mounted on two tracks for moving the hydraulic excavator from one location to another. Each of the two track means has an inside set of rollers and an outside set of rollers for supporting the track over its entire width. There is provided an adjusting structure for moving the tracks inwardly and outwardly to vary the distance between the tracks. A track support apparatus supports the track connected to the adjusting structure. A plurality of arms are connected to the outside of each of the track support apparatus for preventing the hydraulic excavator from falling off of the gondola car when the two tracks are resting on the upper surfaces of the gondola car. The arms are adapted to extend downwardly adjacent to the upper surface of the parallel side walls of the railroad gondola car when the hydraulic excavator is located on top of the gondola car.

It is an object of the present invention to provide an apparatus for the unloading of an open top railcar which allows an excavator to be easily moved toward the top of the railcar.

It is another object of the present invention to provide a ramp apparatus whereby the length of the ramp can be configured to be easily moved on the bed of truck.

It is another object of the present invention to provide a ramp apparatus for the unloading of open top railcars which can be applied to the open top railcar without damage to the external safety appliances of the railcar.

It is still a further object of the present invention to provide a ramp apparatus for the unloading of open top railcars which provides the excavator with positive traction in all weather conditions.

It is still a further object of the present invention to provide a ramp apparatus for the unloading of open top railcars which has superior strength and durability.

It is still a further object of the present invention to provide a ramp apparatus for the unloading of open top railcars which is easy to use, relatively inexpensive and extremely adaptable.

These and other objects and advantages of the present invention will become apparent from a reading of the attached specification and appended claims.

BRIEF SUMMARY OF THE INVENTION

The present invention is an apparatus for the unloading of an open top railcar. This apparatus comprises a ramp having a top surface and a bottom surface, a leg member affixed to the ramp so as to support the bottom surface of the ramp a distance above an underlying surface, and a hanger affixed to one end of the ramp. The hanger is suitable for positioning into the open top of the railcar. The leg member is affixed to the ramp adjacent to an opposite end of the ramp.

The ramp comprises a frame having a first side member and a second side member extending in generally parallel relation to the first side member. Each of the first and second side members has a first and a second track. The leg member is affixed to the frame and extends downwardly therefrom. The leg member includes a first arm affixed to the first side member and extending downwardly therefrom, a second arm affixed to the second side member and extending downwardly therefrom, and a bar affixed to the first and second arms and extending therebetween in generally perpendicular relation to first and second arms. Each of the first and second arms extends at an acute angle with respect to the first and second side members toward an opposite end of the ramp. A plurality of cross members each have one end affixed to the first side member and an opposite end affixed to the second side member.

The ramp has a guardrail extending upwardly from the top surface of the ramp. The guardrail has a first side positioned adjacent to and extending in general parallel relation to the first side member, and a second side positioned adjacent to and extending in general parallel relation to the second side member. The top surface of the ramp has a plurality of cleats formed thereon in generally parallel spaced relation to each other.

The hanger includes a plate having one end affixed to one end of the ramp and extending outwardly therefrom and a flange affixed to an opposite end of the plate and extending downwardly therefrom. The plate extends at an obtuse angle with respect to the bottom surface of the ramp. The flange extends downwardly in generally transverse relation to the plate.

The present invention is also an unloading system that comprises an open top rail car, an excavator, a pair of rails supporting the open top rail car thereon, and a ramp apparatus having a first end received in the open top of the open top rail car and an opposite end supported a distance above the pair of rails. The ramp apparatus has a top surface. The excavator is movable along the top surface of the ramp apparatus.

Specifically, the ramp apparatus includes a panel having the top surface thereon, a leg member affixed to the ramp and extending downwardly therefrom, and a hanger affixed to one end of the ramp. The hanger has a portion extending downwardly into the open top of the open top rail car. The frame is affixed to the bottom side of the panel. The leg member is affixed to the frame and extends downwardly therefrom. The frame includes a first side member affixed to one side of the panel and a second side member affixed to an opposite side of the panel in generally parallel relation to the first side member. The first arm is affixed to the first side member and extends downwardly therefrom. A second arm affixed to the second side member and extends downwardly therefrom. A bar is affixed to the first and second arms and extends therebetween in generally parallel relation to each other. Each of the first and second arms extends at an acute angle with respect to the ramp apparatus towards an opposite end of the ramp. A plurality of cross-members each have one end affixed to the first side member and an opposite end affixed to the second side member. The hanger includes a plate having one end affixed to one end of the ramp and extending outwardly therefrom, and a flange affixed to an opposite end of the plate and extending downwardly therefrom. The flange extends into the open top of the open top railcar. The plate has a surface which abuts the top surface of the railcar.

The ramp apparatus of the present invention allows the ramp to have a reduced angle of climb when the ramp is attached the railcar. On a nine foot tall gondola railcar, the ramp of the present invention is twenty feet long. This would be the same angle of climb as a twenty-seven foot long ramp without the leg member. As such, the ramp can be more easily transported on a conventional truck.

The safety guardrail is located in the center of the ramp and between the tracks of the excavator. This prevents the excavator from straying from the center of the ramp while traveling up the ramp.

The extended car hanger allows the ramp to be used on many different types of open top cars by extending the main beams of the ramp on the railcar so that the ramp does not damage the external safety appliances on the railcar, such as the ladders, brake wheels, and handholds. The cleats are one inch square stock and are installed on the main beams of the ramp in such a way as to be spaced between the grousers on the excavator track pad so as to provide positive traction in all weather conditions. The hanger is constructed of 8"×8"×1¼" structural angle iron. As such, superior strength is provided at the load point.

The foregoing "Summary of the Invention" is intended to describe the preferred embodiment of the present invention and, as such, should not be construed as limiting the scope of the present invention. The scope of the present invention should be defined by the claims herein. This Summary of the Invention should not be limiting of the various forms of the present invention that would be encompassed by the present claims.

DETAILED DESCRIPTION OF THE INVENTION

Figure 1:
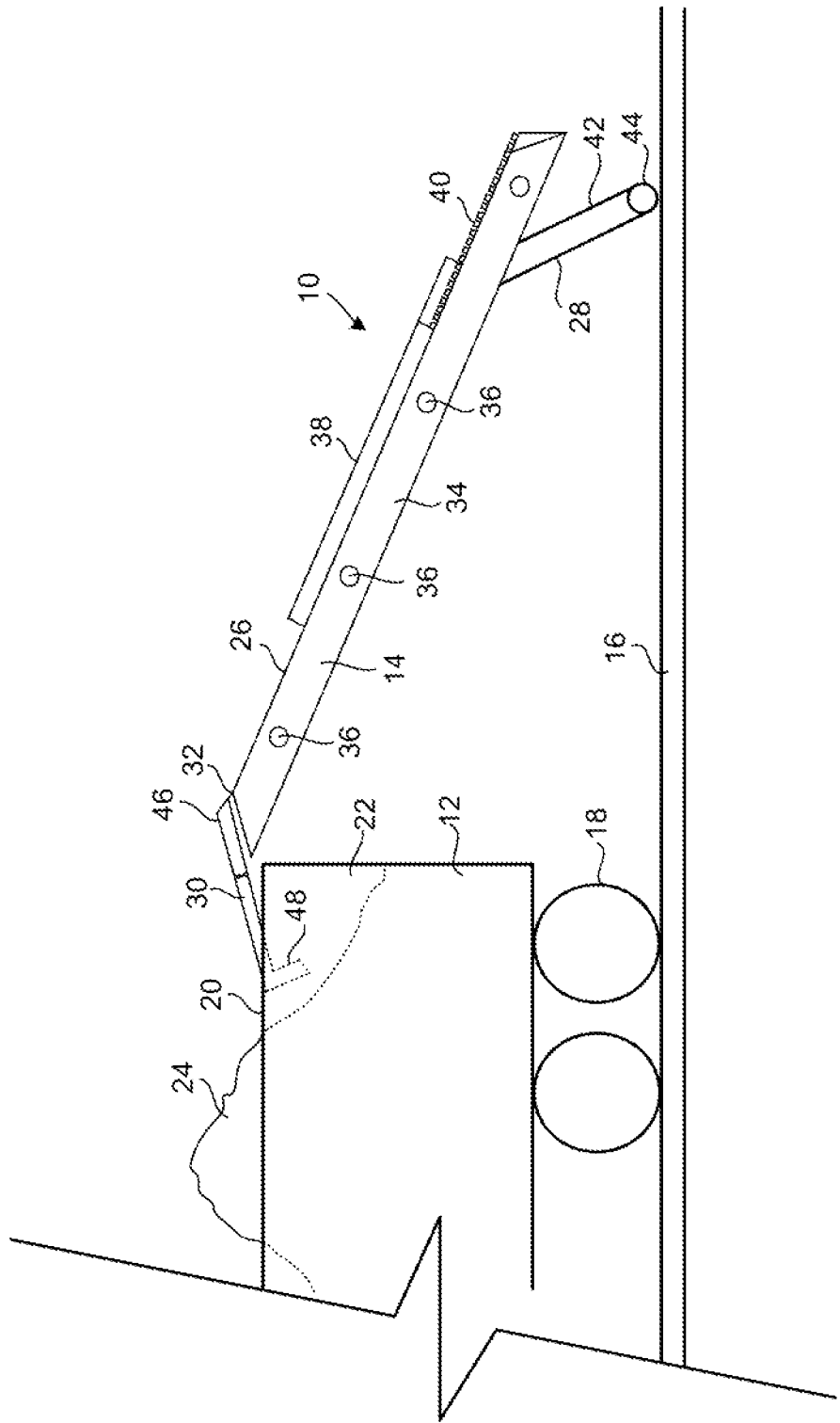
FIG. 1 is a side elevational view of the unloading system of the present invention.

Referring to FIG. 1, there is shown the unloading system 10 in accordance with the teachings of the present invention. The unloading system 10 includes an open top railcar 12 and a ramp apparatus 14. The railcar 12 is in the nature of an open top gondola car. The railcar 12 is supported by a pair of rails 16. In particular, the wheels 18 of the railcar 12 support the railcar 12 in a rollable fashion upon the rails 16. The railcar 12 has a top surface 20 and interior volume 22. The interior volume 22 is suitable for receiving an aggregate material 24 therein.

The ramp apparatus 14 has a frame 26. Frame 26 has a top surface and a bottom surface. A leg member 28 is affixed to the ramp apparatus 14 and extends downwardly therefrom. It can be seen that the leg member 28 serves to support the bottom surface of the frame 26 a distance above an underlying surface, such as rails 16. A hanger 30 is affixed to one end 32 of the ramp apparatus 14. The hanger 30 is suitable for positioning into the open top of the railcar 12.

In FIG. 1, it can be seen that the ramp apparatus 14 includes a first side member 34. The first side member 34 forms one side of the frame 26. As will be described hereinafter, there will be a second side member in parallel relationship to the first side member 34. Additionally, there are a plurality of cross members 36 that extend between the first side member 34 and the second side member. A guard rail 38 is affixed to the top surface of the frame 26 and extends upwardly therefrom. The guard rail 38 is generally positioned centrally of the ramp apparatus 14. The guard rail will be positioned between the tracks of the excavator so as to prevent the excavator from straying from the center of the ramp while traveling up the ramp. A plurality of cleats 40 are affixed to the top surface of the ramp 26 and extend upwardly therefrom. These cleats are in the nature of one inch square stock and are installed on the main beams of the ramp apparatus 14 in such a way as to be spaced between the grousers on the excavator track pads. As such, cleats 40 provide positive traction in all weather conditions.

The leg member 42 is affixed to the first side member 34 and extends downwardly therefrom. The leg member 42 includes a first arm 40 and a bar 44. Bar 44 is located at an opposite end of the arm 40 from the side member 34. Bar 44 is suitable for abutting the top surface of the rail 16. Under other circumstances, the bar 44 can be positioned between the rails so as to rest on a rail tie or on a solid surface adjacent to the rail.

The hanger 30 includes a plate 46 that has one end affixed to the end 32 of the ramp apparatus 14. The plate 46 extends at an acute angle with respect to the frame 26 so as to be directed toward the railcar 12. A flange 48 is formed at the opposite end of the plate 36 from the frame 26. As such, the flange 48 can extend downwardly into the open top of the railcar 12. The hanger 30 allows the ramp apparatus 14 to be used on many different types of open top railcars by extending the main beams of the railcars so that the ramp does not damage the external safety appliances on the railcar, such as the ladders, brake wheels and hand holds.

Figure 2:
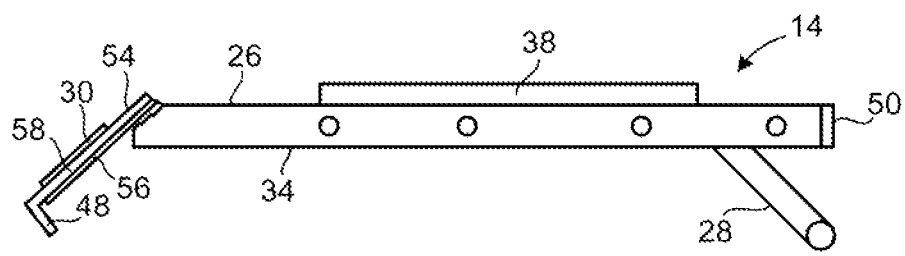
FIG. 2 is a side elevational view of the ramp apparatus as used in the unloading system of the present invention.

FIG. 2 is an isolated side view of the ramp apparatus 14. The guard rail 38 is positioned generally centrally of the frame 26. The leg member 28 extends downwardly from the frame 26 and outwardly toward the end 50 of the frame 26. The leg member 28 extends at an acute angle with respect to the plane of the frame 26.

The hanger 30 is illustrated as being of a multi-layer welded configuration. In particular, sides 54 and 56 serve to receive another plate 58 therebetween. The flange 48 extends outwardly of the plate 58. As such, the hanger 30 has a secure and sound construction.

Figure 3:
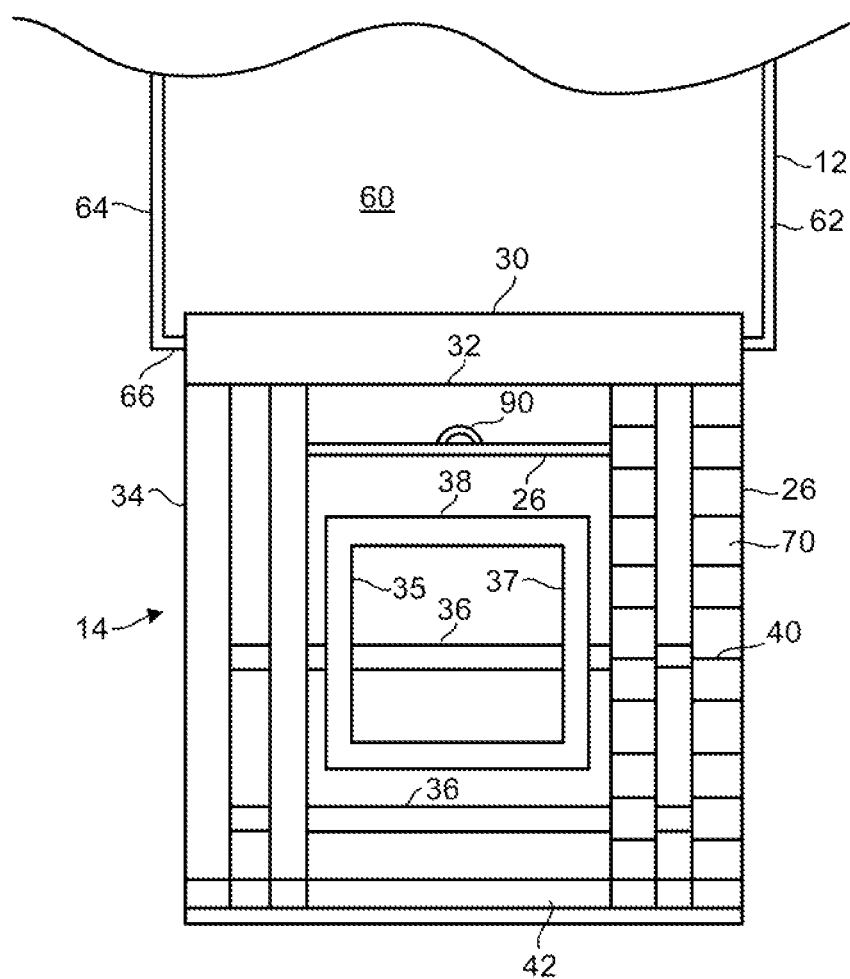
FIG. 3 is a plane view of the unloading system of the present invention.

FIG. 3 is a plan view showing the ramp apparatus 14 as received within the open top 60 of the railcar 12. The leg member 42 is shown on an opposite end of the ramp apparatus. The railcar 12 is illustrated as having sides 62 and 64. Additionally, the railcar 12 includes an end wall 66. The hanger 30 is illustrated as resting upon the top of the end wall 66 of railcar 12.

In FIG. 3, it can be seen that the frame 26 includes the first side member 34 and second side member 70. Cross-members 36 extend between the first side member 34 and second side member 70. In the preferred embodiment of the present invention, each of the first and second side members comprise two parallel tracks upon which an excavator can travel. A plurality of cleats 40 are formed in generally spaced parallel relationship to each other along the top surface of the two tracks of the second side member 70.

The ramp apparatus 14 includes the frame 26 that has one end 32 affixed to the hanger 30. Guard rail 38 is affixed to centrally of the frame 26. In the preferred embodiment of the present invention, the guard rail 38 has a rectangular configuration wherein opposite sides 35 and 37 are positioned adjacent to and extend in generally parallel relation to side members 34 and 70, respectively. A connection loop 90 is shown attached to one of the cross-members 36 for transport of the ramp apparatus.

Figure 4:
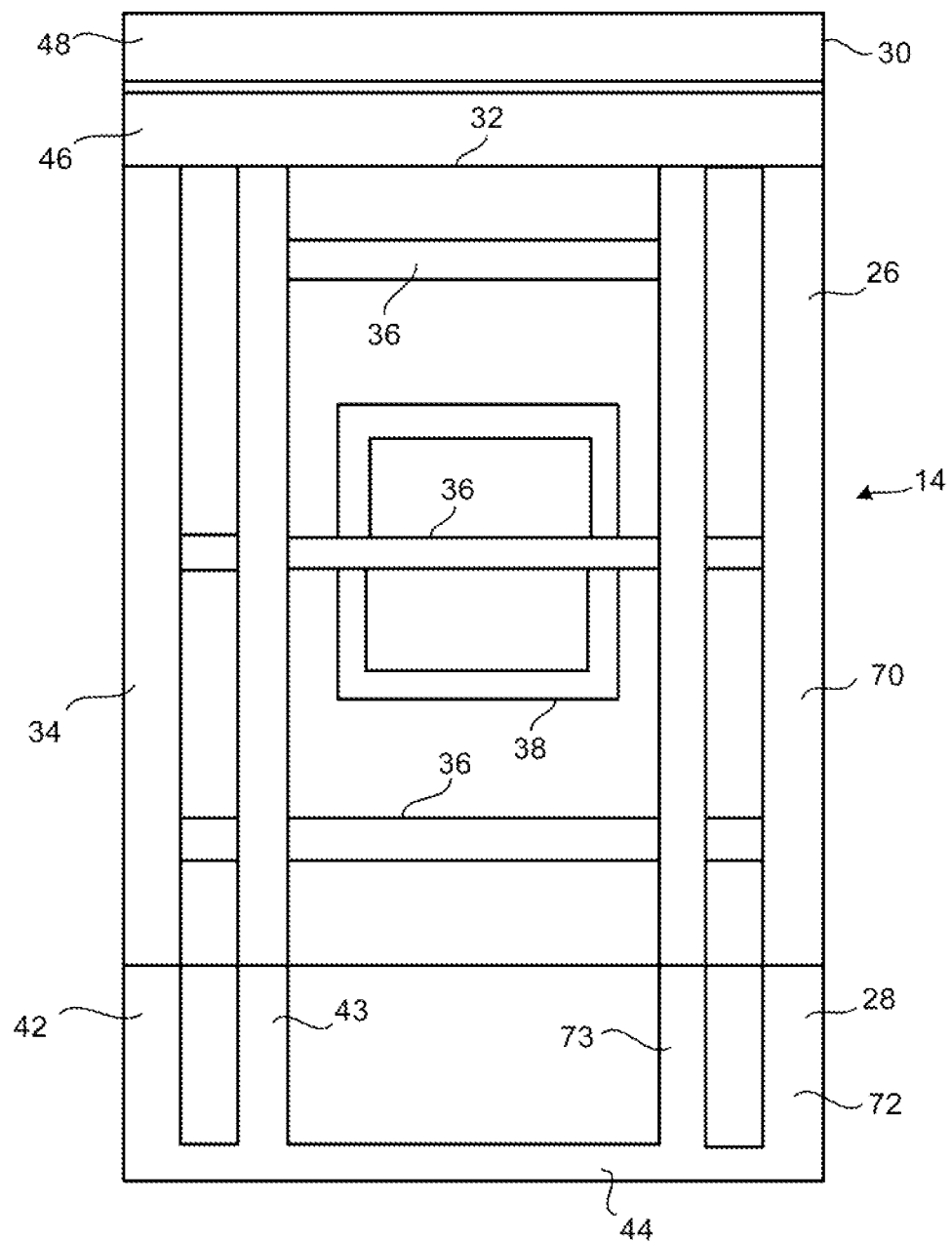
FIG. 4 is bottom view of the ramp apparatus of the present invention.

FIG. 4 shows the underside of the ramp apparatus 14. In particular, the ramp apparatus 14 includes the first side member 34 and a second side member 70. These side members provide structural support to the frame 26. Cross members 36 extend between the side members 34 and 70.

The leg member 28 includes a first arm 42, a second arm 72 and a bar 44. In one embodiment of the present invention, the leg member further includes arms 43 and 73, paired with first arm 42 and second arm 72, respectively. The hanger 30 is illustrated as secured to the end 32 of the side members 34 and 70 and to the panel 26. The flange 48 extends inwardly generally transverse to the plane of the plate 46 of the hanger 30.

Figure 5:
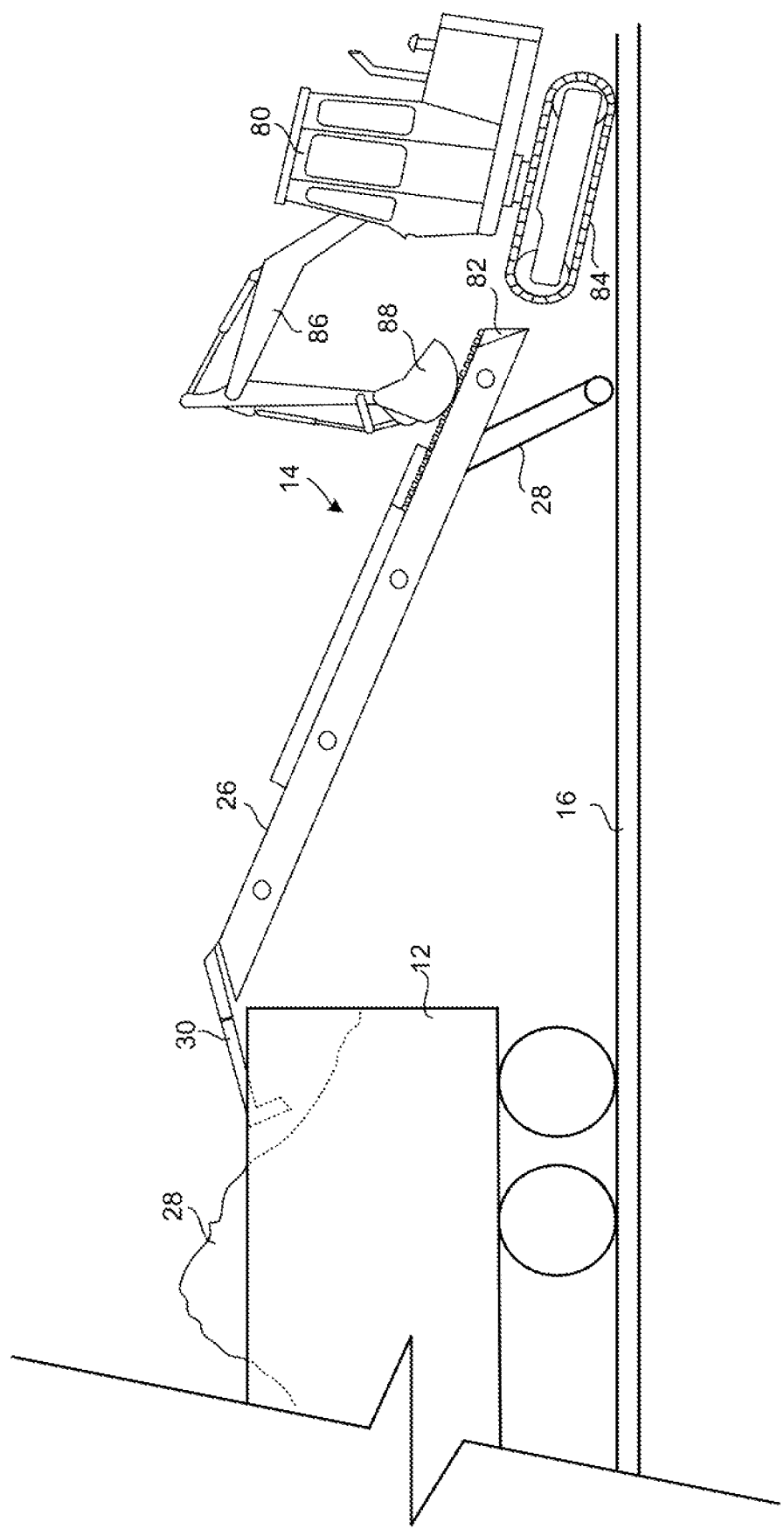
FIG. 5 is an illustration of the system of the present invention as used with an excavator.

FIG. 5 shows the manner in which an excavator 80 can be moved onto the top surface of the frame 26 of the ramp apparatus 14. As was stated previously, the ends 82 of the ramp apparatus 14 are supported a distance above the rail 16 by the leg member 28. This arrangement allows a shorter length of ramp to be used than would be conventionally expected. In order to provide an angle of climb that is suitable for the excavator 80, one having a ordinary skill in the art would think that it was necessary to extend that frame 26 entirely downwardly toward the top surface of the rail 26. As such, the treads 84 of the excavator 80 could move onto the top surface of the frame 26 in a conventional manner. Unfortunately, it is very difficult to transport such long sections of the ramp apparatus 14. As such, the present invention significantly improves efficiency by providing a shorter length ramp (of approximately twenty feet) which can be shipped and stored conveniently and easily. The trade off is that a more complex technique for manipulating the excavator 80 onto the ramp apparatus 14 would be required.

As can be seen in FIG. 5, the arm 86 of the excavator 80 has bucket 88 at a bottom thereof. Bucket 88 can be utilized so as to lift the front of the treads 84 upwardly until the front of the treads 84 reaches the end 82 of the ramp apparatus 14. As such, the treads 84 can then traverse the length of the ramp apparatus 14. Ultimately, the excavator 80 will move until it reaches an area generally adjacent to the hanger 30. The excavator then travels into the railcar 12 and positions itself on the aggregate material 24 and then unloads the material as it travels from car to car, ultimately exiting the train at the other end, onto another ramp or onto the same ramp after it is moved to the other end of the train by another machine, such as a front end loader.

During exiting from the railcar, if necessary, the arm 86 and the bucket 88 can then be rotated to the opposite direction so that treads 84 can move downwardly along the frame 26 of the ramp apparatus 14. The arm 86 and the bucket 88 can be suitably manipulated so that the treads 84 can gracefully exit the end 82 of the ramp apparatus 14 and back to the earth. After use, the ramp apparatus 14 can be easily lifted and placed in a desired location for transport and/or storage.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

I claim:

1. An apparatus for the unloading of an open top rail car, the open top rail car being supported on a pair of rails, the apparatus comprising:
   a ramp having a top surface and a bottom surface, said ramp comprising a frame having a first side member and a second side member, said second side member extending in generally parallel relation to said first side member, said first side member having a first track and a second track, said second side member having a first track and a second track;
   a leg member affixed adjacent one end of said ramp, said leg member adapted to support said bottom surface at said one end of said ramp a distance spaced above the pair of rails, said leg member comprising:
      a first arm rigidly affixed to said first side member and extending downwardly therefrom;
      a second arm rigidly affixed to said second side member and extending downwardly therefrom; and
      a bar affixed to an end of said first and second arms opposite said first and second side members, said bar positioned directly below said end of said ramp; and
   a hanger affixed to an opposite end of said ramp, said hanger suitable for positioning into the open top of the rail car.

2. The apparatus of claim 1, each of said first and second arms extending at an acute angle.

3. The apparatus of claim 1, further comprising:
   a plurality of cross-members each having one end affixed to said first side member and an opposite end affixed to said second side member.

4. An unloading system comprising:
   an open top rail car;
   an excavator;
   a pair of rails supporting said open top rail car thereon; and
   a ramp apparatus having a first end received in the open top of said open top rail car and a second end supported a spaced distance above said pair of rails, said ramp apparatus having a top surface, said excavator being movable along said top surface of said ramp apparatus, said ramp apparatus comprising:
      a frame having said top surface thereon;

a leg member affixed to said ramp and extending downwardly therefrom; and a hanger affixed to said first end of said ramp, said hanger having a portion extending downwardly into the open top of said open top rail car, said frame comprising:

a first side member;

a second side member opposite said first side member and extending in generally parallel relation to said first side member; and a plurality of cross-members each having one end affixed to said first side member and an opposite end affixed to said second side member, said leg member comprising:

a first arm affixed to said first side member and extending downwardly therefrom;

a second arm affixed to said second side member and extending downwardly therefrom; and a bar rigidly affixed to an end of said first and second arms opposite said first and second side members and extending therebetween in generally parallel relation to said plurality of cross-members, said bar abutting said pair of rails in a location below said second end of said ramp such that said second end of said ramp is spaced above said pair of rails.

5. The unloading system of claim 4, each of said first and second arms extending at an acute angle towards said second end of said ramp.

6. The unloading system of claim 4, further comprising:

a guardrail positioned on said top surface of said ramp apparatus.

7. The unloading system of claim 4, said hanger comprising:

a plate having one end affixed to said first end of said ramp and extending outwardly therefrom; and a flange affixed to an opposite end of said plate and extending downwardly therefrom, said flange extending downwardly into the open top of said open top rail car, said plate having a bottom surface supported by a top edge of said open top rail car.

\* \* \* \* \*